May 9, 1967 W. K. HODDER 3,319,013

APPARATUS FOR RECORDING HIGH FREQUENCY SIGNALS ON MAGNETIC TAPE

Filed Oct. 22, 1962 3 Sheets-Sheet 1

INVENTOR.
WAYNE K. HODDER
BY
Christie, Parker & Hale
ATTORNEYS.

May 9, 1967 — W. K. HODDER — 3,319,013

APPARATUS FOR RECORDING HIGH FREQUENCY SIGNALS ON MAGNETIC TAPE

Filed Oct. 22, 1962 — 3 Sheets-Sheet 2

INVENTOR.
WAYNE K. HODDER
BY
Christie, Parker & Hale
ATTORNEYS.

May 9, 1967 W. K. HODDER 3,319,013

APPARATUS FOR RECORDING HIGH FREQUENCY SIGNALS ON MAGNETIC TAPE

Filed Oct. 22, 1962 3 Sheets-Sheet 3

INVENTOR.
WAYNE K. HODDER
BY
Christie, Parker & Hale
ATTORNEYS.

United States Patent Office 3,319,013
Patented May 9, 1967

3,319,013
APPARATUS FOR RECORDING HIGH FREQUENCY SIGNALS ON MAGNETIC TAPE
Wayne K. Hodder, Glendora, Calif., assignor, by mesne assignments, to Bell & Howell Company, Chicago, Ill., a corporation of Illinois
Filed Oct. 22, 1962, Ser. No. 231,916
5 Claims. (Cl. 179—100.2)

This invention relates generally to apparatus for modulating a carrier with an information signal and, more particularly, is concerned with a modulation system for recording and faithfully reproducing high frequency signals on magnetic tape.

In recording and reproducing signals using magnetic tape, the magnetic tape may be considered as a transmission medium which has certain finite band width limitations. The upper end of this band may be extended to some extent by increasing the relative speed of the tape but as the speed in increased, the signal level drops off and a point is reached where the signal-to-noise ratio is too small to provide effective recording. Moreover, as tape speed is increased, the lower frequency end of the band is raised, because the wave length on the tape becomes too long. Since the tape band width is limited by inherent factors in the recording technique, broad band recording requires that the most efficient use be made of the available band. Direct linear recording, which would provide full use of the available band for information signals, requires an A.C. bias to be used, but to use A.C. bias at high frequencies is difficult because of head power losses. Direct recording can not be used where the information band includes D.C. Furthermore, the tape system introduces some amplitude modulation in the reproduced signal which becomes excessive when operating at the high head-to-tape speeds necessary for recording high frequency signals.

Various modulation schemes have been proposed to overcome some of the problems encountered in direct recording of high frequency signals. While single-side-band amplitude modulation makes the most efficient use of available band width, it does not overcome the problem of A.C. bias and the inherent amplitude modulation introduced by the tape recording system itself. By using pulse width modulation, only two amplitude levels of recording are used so that A.C. bias is not required and the width of the pulses is not affected by subsequent amplitude modulation introduced by the recording system. However, present methods of pulse width modulation require too large a transmission band width for effective use with magnetic tape recorders. Frequency modulation has been used in tape recording, but the distribution of side band modulation products is such that the ratio of signal band width is still not as high as desirable without undue signal distortion.

The present invention is directed to an improved arrangement for recording a broad band frequency spectrum on magnetic tape utilizing a unique type of pulse width modulation which provides a band width efficiency approaching that of single-side-band amplitude modulation. In brief, the present invention is directed to a high frequency magnetic tape recording system including means for generating a carrier signal preferably having two discrete D.C. voltage levels. The carrier signal generating means includes means for switching the carrier signal from one voltage level to the other. Modulation of the carrier signal is provided by means for actuating the switching means at intervals determined by the instantaneous amplitude of the information input signal at the end of each switching interval. Thus the modulated carrier signal is in the form of a rectangular wave in which the time duration between crossover points is a function of the amplitude changes of the information input signal. The rectangular wave, when recorded on tape, uses only two amplitude levels of recording, thus eliminating the need for any A.C. bias. Playback is accomplished by providing means for sensing the changes in flux level and generating pulses at time intervals determined by the corresponding time intervals between the sensed flux changes on the tape. Demodulation may be accomplished by converting the intervals between pulses to pulses having, for example, amplitudes proportional to the time intervals and then passing the varying pulses through a suitable low-pass filter.

For a more complete understanding of the invention, reference should be made to the accompanying drawings, wherein.

Figure 1:
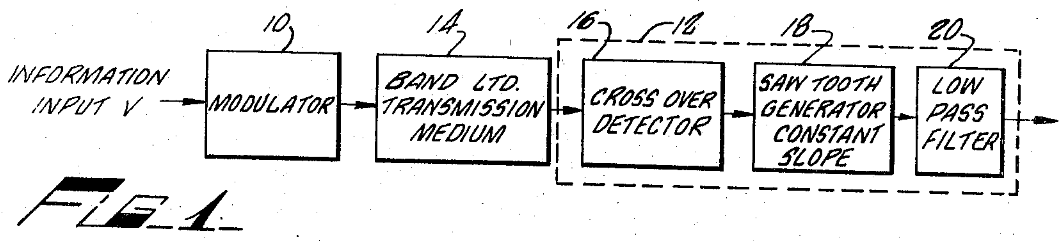
FIGURE 1 is a block diagram showing the essential steps of the modulation recording and demodulation process.
Figure 2:
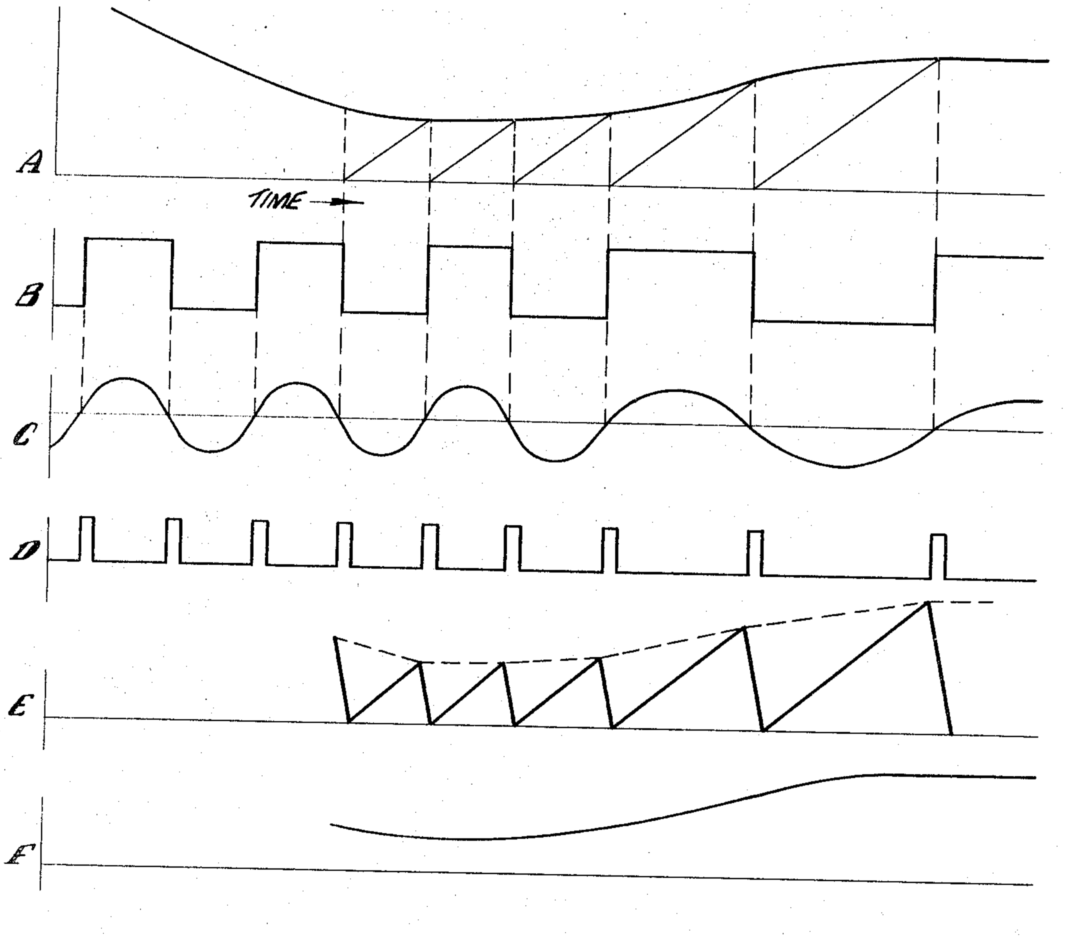
FIGURE 2 is a series of wave forms used in explaining the operation of the invention.

Referring to FIGURE 1, an input signal, whose amplitude V varies as a function of time, is applied to the input of a modulator 10. A typical wave form of the input information signal is shown in FIGURE 2A. The modulator 10 is designed, as hereinafter described in detail, to generate a rectangular output wave as shown in FIGURE 2B. The half cycle duration of the rectangular wave varies as a function of the amplitude V of the information input signal. The modulator 10 is designed to satisfy the relationship $T_n = kV_n$, where $V_n$ is the amplitude of the information signal occurring simultaneously with the end of the sampling duration $T_n$. This method of modulation is unique in that the output wave form of the modulator, as shown in FIGURE 2B, does not have reference timing points which are equally spaced in time, as in the case of conventional pulse width modulation. Thus the generated wave form is nonsynchronous. The duration-determining crossover is always used as the time reference for the next following interval. As a result, the wave form need not return to a reference voltage before making the next time duration measurement. Thus the sampling rate is twice that needed for standard pulse width modulation for the same number of zero crossings. This means that twice the information can be passed through a particular transmission medium as compared to conventional PDM operation.

The modulator 10 may incorporate a number of well known circuits by which a time delay is generated proportional to an applied voltage. Typically such circuits involve means for generating a voltage which changes in amplitude linearly with time and means for comparing the generated signal with the amplitude of the information input signal. When the two amplitudes are equal, the output of the modulator 10 is switched from one level to the other and the process repeated. A preferred modulator circuit for accomplishing the described modulation process is described below in connection with FIGURE 3.

The output of the modulator 10 is transmitted to a demodulator 12 over a band limited transmission medium 14 such as a magnetic tape recorder. Because of the limited band width of the transmission medium 14, the output signal, as shown in FIGURE 2C, no longer has the rectangular wave shape of the input. However, if the percentage modulation is small, the zero crossover points of the output signal occur at the same time intervals as the crossover points of the rectangular wave. Thus the information is still contained in the timing of the zero crossover points. A change of as much as fifteen percent in the time interval between crossover points with maximum change in the voltage of the information input signal has been found to be acceptable.

The demodulator includes a crossover detector 16 which generates sharp pulses at the zero crossover points, as shown by the wave form of FIGURE 2D. Crossover detectors are well known circuits which usually involve a full wave rectifier, resulting in voltage spikes occurring at the half cycle points that are easily isolated. The output of the crossover detector is applied to a saw-tooth generator 18 of constant slope. Thus, as the time interval between the pulses applied to the saw-tooth generator varies, the peak amplitude of the saw-tooth wave changes in linear relationship to the time interval. The output wave form of the saw-tooth generator is shown in FIGURE 2E. This output is passed through a low-pass filter 20 which averages out the peak amplitudes, providing a signal of wave form corresponding to the information input signal, as shown in FIGURE 2F.

Various circuits are possible for performing the function of the modulator 10. One of the simplest of these circuits is a multivibrator which is switched from one stable state to the other at time intervals directly proportional to the instantaneous amplitude of the information input signal. However, the multivibrator circuit presents a problem in balancing the constants of proportionality between alternate zero crossings, since different timing circuits are involved in the two halves of the conventional multivibrator circuit.

Figure 3:
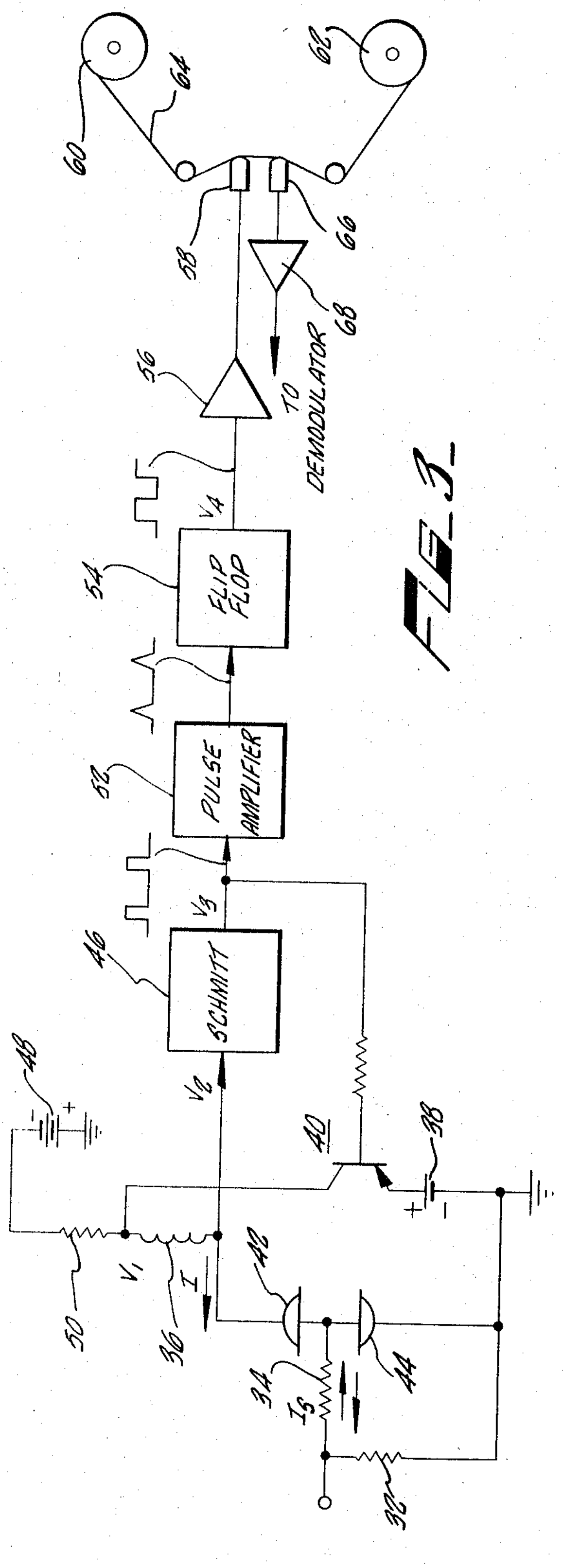
FIGURE 3 is a schematic diagram of a modulator circuit.

A preferred circuit for providing modulation is shown in FIGURE 3. With this circuit, each time period is generated by the same circuit components, thus eliminating any unbalance in the constant of proportionality.

Referring to FIGURE 3 in detail, an input information signal is applied to an input terminal across an input impedance 32. The input signal provides a varying current $I_s$ through a series resistor 34. The current $I_s$ is added to or subtracted from a charging current flowing through an inductance 36. The charging current is derived from a potential source 38 connected to one end of the inductance 36 through a transistor switch indicated generally at 40. The switch 40 may be considered as normally closed, providing a low impedance current path between the collector and emitter electrodes. Connected in series with the inductance 36 are a pair of tunnel diodes 42 and 44 which are connected in back-to-back relationship with the series input resistor 34 connected to the common junction between the tunnel diodes.

The junction point between the inductance 36 and the tunnel diode 42 is connected to the input of a Schmitt trigger circuit 46. The Schmitt trigger circuit has a characteristic that as the level of the input varies, the output assumes one of two predetermined levels. The output of the Schmitt trigger circuit 46 is coupled to the base of the transistor switch 40 such that the Schmitt trigger turns the switch on and off as the output changes from one level to the other. When the switch 40 is open, current is caused to flow in the reverse direction through the inductance 36 from an essentially constant current source provided by a battery 48 and a large series resistor 50 connected to the inductance 36.

Figure 4:
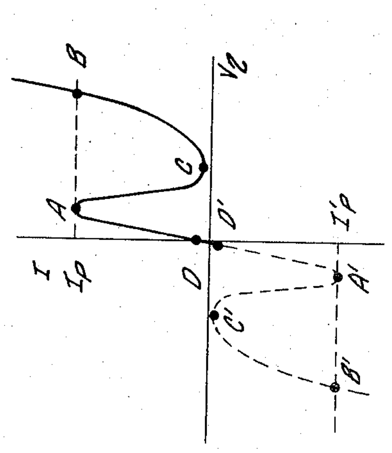
FIGURE 4 is a diagram of the characteristics of the tunnel diodes in the circuit of FIGURE 3.
Figure 5:
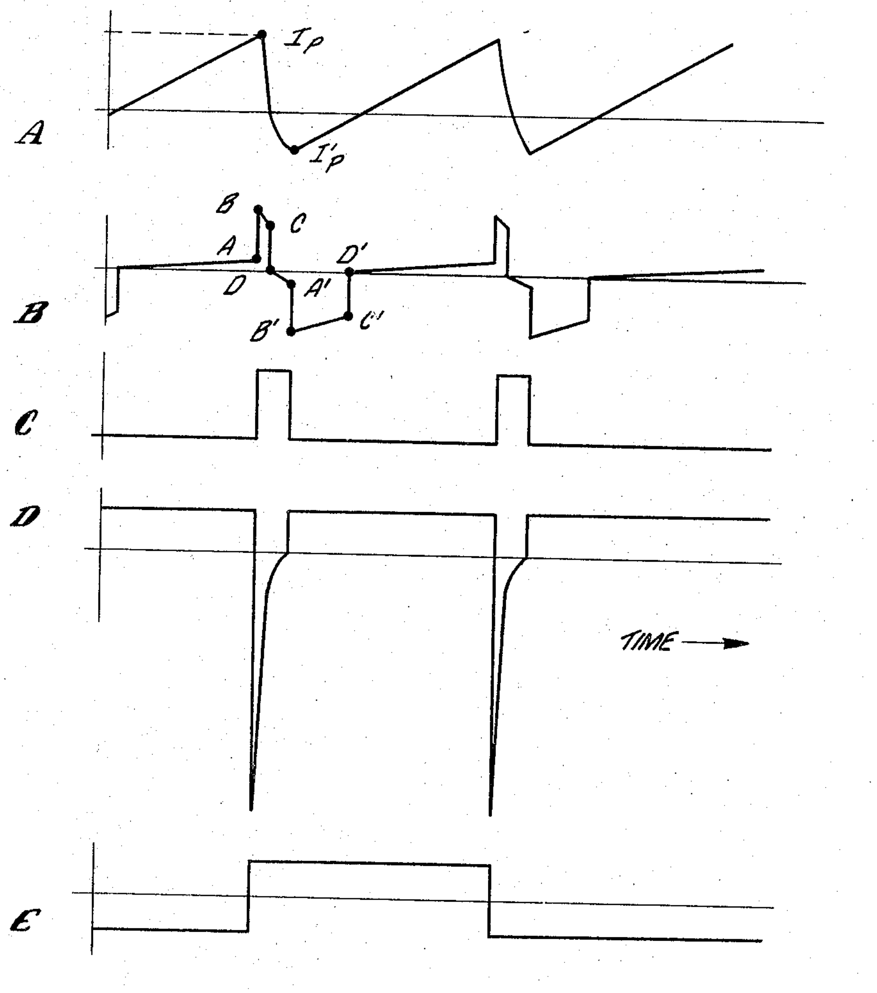
FIGURE 5 is a series of wave forms illustrating the operation of the modulator of FIGURE 3.

Operation of the modulator circuit can best be appreciated by reference to the wave form shown in FIGURES 4 and 5. As seen in FIGURE 4, the tunnel diodes have the characteristic that as the voltage across the tunnel diode increases in one polarity, the impedance characteristic of the tunnel diode is such that the current increases linearly to a peak value $I_p$, corresponding to point A in FIGURE 4. The tunnel diode then has a negative resistance characteristic causing the current to decrease to point C and then increase again to point B. Thus in a current controlled device, as the current increases continuously, the voltage will increase from zero up to the value corresponding to point A and then will jump to a value corresponding to point B. In the reverse direction, the tunnel diode has a very low impedance value and may be neglected for the purpose of the present discussion. Since two tunnel diodes are connected back-to-back, the same characteristic is provided for current flow in the opposite direction by the other tunnel diode, as indicated by the dash line in FIGURE 4.

Assuming for the moment a zero input signal, i.e., $I_s=0$, when the transistor switch 40 is closed, a current I begins to flow through the inductance L. Because of the inductance, the current increases linearly with time through the tunnel diode 44 until it reaches a peak value $I_p$, at which point the voltage $V_2$ at the input to the Schmitt trigger circuit 46 changes abruptly, corresponding to the change from point A to point B on the tunnel diode characteristic shown in FIGURE 4. The linear change in current is shown in the wave form of FIGURE 5A. As shown by the curve of FIGURE 5B, the voltage $V_2$ on the input of the Schmitt trigger increases very slightly due to the small resistance of the tunnel diode 44. When the peak current $I_p$ is reached, the voltage $V_2$ jumps from its value at point A to its value at point B of FIGURE 4. This voltage change operates the Schmitt trigger 46 to open the transistor switch 40.

Because of the reverse voltage applied to the inductance 36 by the potential source 48, the current I, as shown by the wave form of FIGURE 5A, then decreases sharply, finally reaching a negative value $I_p'$ corresponding to the peak current value of the tunnel diode 42. At this point, the voltage $V_2$ abruptly changes in a negative direction causing the Schmitt trigger 46 to return to its original level thereby closing the transistor switch 40.

As shown by the wave form of FIGURE 5B, as the current I drops off, the voltage $V_2$ drops from the value at point B to the value at point C on the tunnel diode characteristic curve of FIGURE 4. The voltage then abruptly changes from the value at point C to the value at point D, the latter value being substantially zero. As the current I increases in the reverse direction, the voltage $V_2$ changes to a value corresponding to point A′ and then abruptly shifts to a more negative value corresponding to point B′ of the tunnel diode characteristic shown in FIGURE 4. This abrupt change of voltage in a negative direction operates the Schmitt trigger to again close the transistor switch 40, causing the current I to decrease through the inductance 36 and then change direction to rise along a linear slope as shown by the wave form of FIGURE 5A. As the current reaches a value corresponding to point C′, the voltage $V_2$ returns abruptly to the value corresponding to point D′ and then very slowly increases to the value corresponding to point A. As shown by the wave form of FIGURE 5C, the voltage $V_3$ at the output of the Schmitt trigger is in the form of a series of pulses having a leading edge corresponding in time to the points of peak current $I_p$ of the tunnel diode 44 and the peak current $I_p'$ of the tunnel diode 42. The voltage change $V_1$ at the junction point of the inductance 36 and series resistor 50, as produced by the opening and closing of the transistor switch 40, is shown in FIGURE 5D.

It will be seen that as the signal current $I_s$ adds or subtracts from the current I through the tunnel diodes, the time at which the current I reaches the peak value $I_p$ must vary. Thus the leading edges of the pulses in the wave form of FIGURE 5C occur at intervals which are determined by the value of the signal current $I_s$. As the signal current changes in a positive or negative direction around a zero value, the time interval between the leading edges of successive pulses at the output of the Schmitt trigger 46 varies around some intermediate value determined by the voltage of the source 38 and the inductance value of the inductance 36.

The output pulses derived from the Schmitt trigger 46 are applied to a pulse amplifier 52. The output pulses from the pulse amplifier are used to operate a flip-flop or a trigger circuit 54. The flip-flop changes between two output levels, the change between output levels taking place with each input pulse received from the pulse amplifier 52. Thus the output of the flip-flop is a rectangular wave whose half cycle time intervals vary in response to the instantaneous value of the input signal $I_s$. The wave form of the output of the flip-flop 54 is shown in FIGURE 5E.

The output of the flip-flop 54 is applied through a suitable magnetic head driving amplifier 56 to a magnetic recording head 58. The recording head 58 is part of a suitable tape transport shown schematically as including tape drive reels 60 and 62 for passing magnetic tape 64 across the recording head 58. The recorded information is sensed on playback by playback head 66 coupled to a suitable output amplifier 68. The output of the amplifier 68 is demodulated in the manner described above in connection with FIGURE 1.

What is claimed is:

1. A high frequency recording system for recording an input signal on magnetic tape comprising means for generating a carrier signal varying between two voltage levels, means for switching the generating means alternately from one voltage level to the other, means for actuating the switching means at intervals directly proportional to the amplitude of the input signal at the end of each interval, means reversing the magnetic flux of the tape in response to the change in level of said output signal, means for sensing the flux reversals on tape for generating pulses at time intervals corresponding to the time intervals between sensed flux reversals on the tape, means for converting the intervals between pulses to pulses having amplitudes proportional to said intervals, and low-pass filter means coupled to the variable amplitude pulses for producing variable amplitude output signals from said variable amplitude pulses.

2. Apparatus for recording a broad band information signal on magnetic tape comprising means for generating a first signal having an amplitude that changes linearly at a fixed predetermined rate with time, means responsive to the information signal and the linearly changing signal for generating a pulse when the amplitudes of the information signal and the linearly changing signal have a predetermined relationship, a bistable device for producing an output signal having two discrete levels, the bistable device being triggered alternately between the two states by applied input pulses, means for triggering the bistable device from either level to the other level in response to each pulse from the pulse generating means, means responsive to each pulse from the pulse generating means for resetting the first signal generating means, and means reversing the magnetic flux of the tape in response to the change in level of said output signal from the bistable device.

3. Apparatus for recording a video input signal on magnetic tape comprising means for generating a carrier signal having an alternating voltage wave form, the alternating voltage defining a zero-crossover between each half cycle, means for varying the time interval between zero-crossover points of each half cycle of the carrier in direct proportion to the instantaneous amplitude of the information input signal, and means for recording the carrier signal on magnetic tape.

4. Apparatus for recording a video signal comprising means generating a reference signal that varies with time linearly in amplitude from a predetermined starting level, means for comparing the amplitude of the video signal with the reference signal, means for detecting the occurrence of a given relationship between the compared amplitudes, means responsive to the detecting means for resetting the reference signal generating means back to the starting level to start another operation, means responsive to the detecting means for switching an output signal from either one to the other of two amplitude levels with each occurrence of said relationship between the compared amplitudes, and means for recording the output signal on a recording medium.

5. Apparatus for modulating, transmitting and demodulating a board band information signal over a minimum band transmission link provided by a magnetic tape recording system, comprising means for generating a signal having an amplitude that changes linearly with time, means responsive to the information signal and the linearly changing signal for generating an impulse when the amplitude of the information signal and the linearly changing signal have a predetermined relationship, means responsive to the impulses for generating an alternating signal having the zero-crossover points synchronous with said impulses, means for recording the alternating signal on magnetic tape, means responsive to the recorded signal on tape for sensing the zero-crossover points of the received signal, and means for converting the time intervals between crossover points to pulses of an amplitude proportional to the time intervals.

References Cited by the Examiner

UNITED STATES PATENTS

| | | | |
|---|---|---|---|
| 2,950,352 | 8/1960 | Belck | 179—100.2 |
| 3,009,025 | 11/1961 | Takayanagi | 179—100.2 |

FOREIGN PATENTS

| | | |
|---|---|---|
| 897,044 | 5/1962 | Great Britain. |

BERNARD KONICK, *Primary Examiner.*

TERRELL W. FEARS, *Assistant Examiner.*